3,307,519
FARROWING CRATE
Harold J. Rink and Merlyn P. Smith, both of
Pender, Nebr. 68047
Filed Oct. 1, 1965, Ser. No. 492,076
1 Claim. (Cl. 119—20)

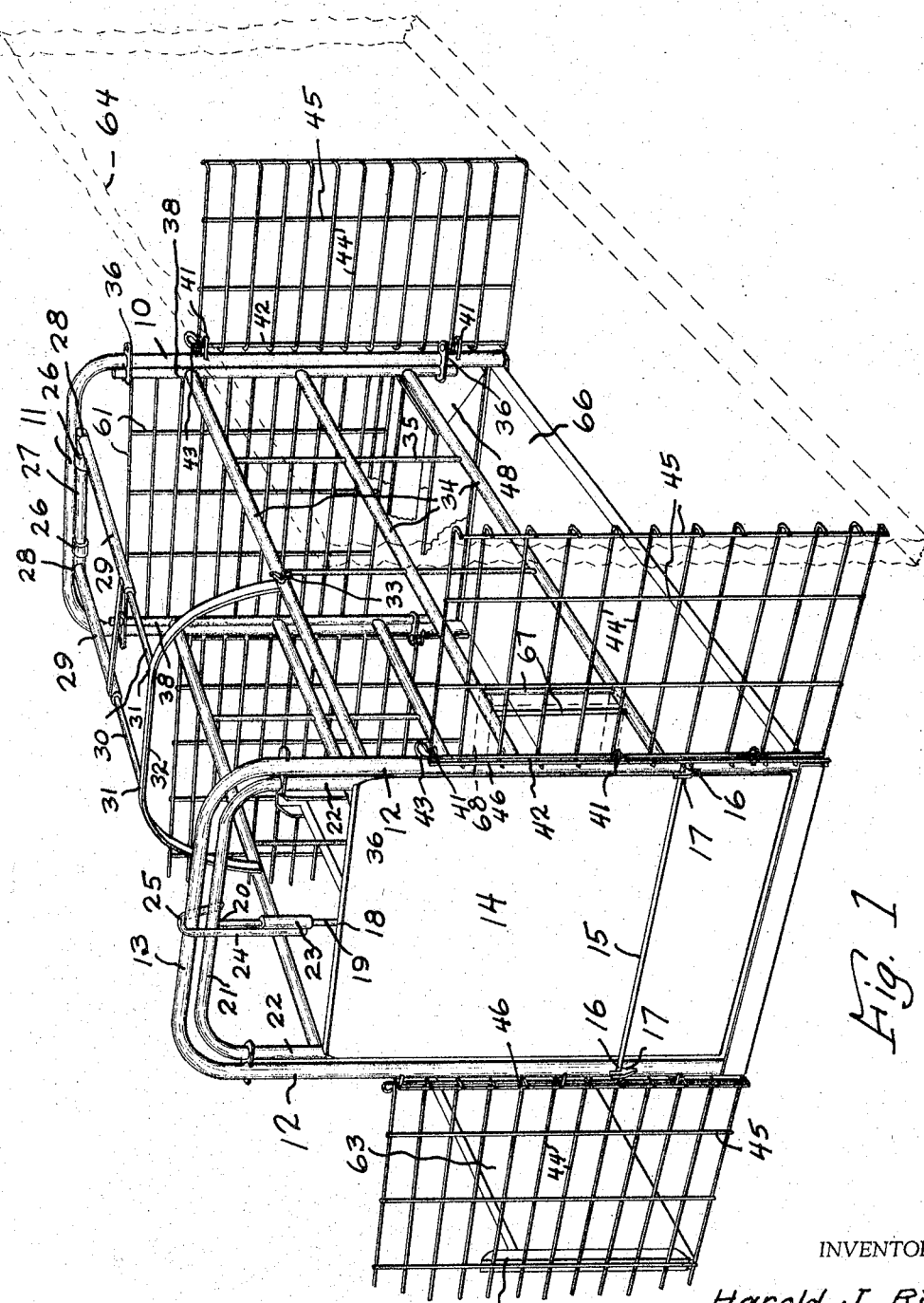

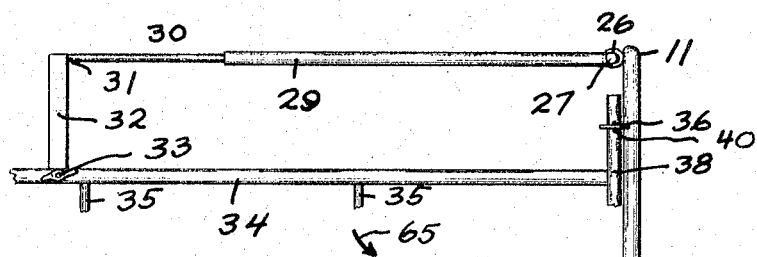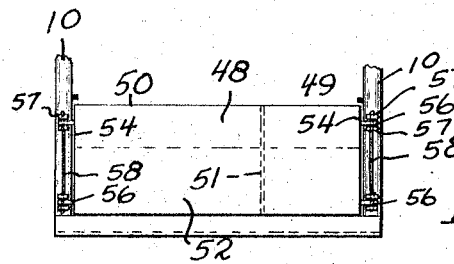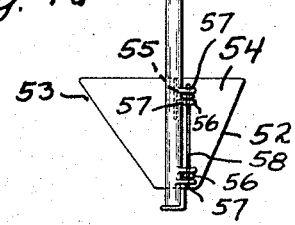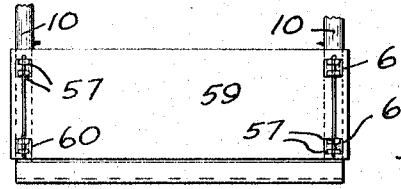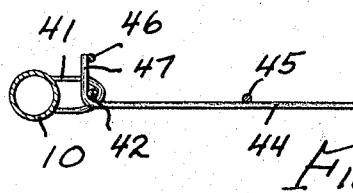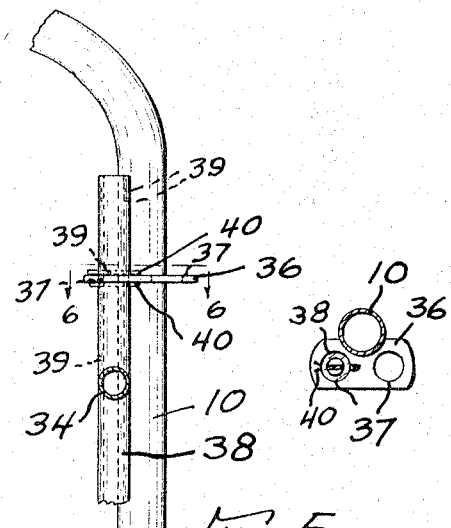
INVENTORS
Harold J. Rink
Merlyn P. Smith
BY Sam J. Slotsky
ATTORNEY

United States Patent Office 3,307,519
Patented Mar. 7, 1967

Our invention relates to a farrowing crate.

An object of our invention is to provide a farrowing crate which is adjustable in that it can be made larger laterally, and which crate includes a variety of other adjustable features to fit any size sow.

A further object of our invention is to provide a crate which is readily foldable to a compact size and shape for shipping purposes.

A further object of our invention is to provide a farrowing crate having special feeding and watering arrangements which are readily adapted to the crate, and to provide means for adjustably positioning the side members consistent with the growth of the small pigs, and to also provide further features.

With these and other objects in view, our invention consists in the construction, arrangement, and combination of the various parts of our device, whereby the objects contemplated are attained, as hereinafter more fully set forth, pointed out in our claim, and illustrated in the accompanying drawings, in which:

FIGURE 1 is an isometric view with certain fragmentary sections of the crate,

FIGURE 2 is a side view of a portion of the crate,

FIGURE 3 is a rear view showing the insertion of the feeding and watering arrangement, FIGURE 4 is a similar view to FIGURE 3 showing the use of an alternate plate member, FIGURE 5 is an enlarged detail, FIGURE 6 is a sectional view taken along the lines 6—6 of FIGURE 5, and FIGURE 7 is a further detail.

Our invention contemplates the provision of a farrowing crate having a variety of advantages as mentioned hereinabove, and in describing our invention we have used the character 10 to designate a framework member having the integral upper portion 11, the members 10 and 11 being preferably made of suitable pipe material, the character 12 indicating further similar framework members merging with the horizontal portion 13.

The character 14 indicates a vertically positioned plate for providing the gate, which plate is welded to the transverse rod 15 having the end portions 16 receivable in the ears 17. Welded at 18 to the member 14 is a vertically positioned rod 19 which is welded at 20 to the horizontal member 21 which merges with the vertical members 22. The character 23 indicates a slidable sleeve which receives the rod 19, and attached to the member 23 is the hook member 24 having the hook portion 25 adapted to receive the member 13 when the gate is in closed position as shown in FIGURE 1.

Attached to the member 11 are the sleeves 26 which rotatably receive the rod 27 to which is attached at 28 the longitudinally extending tubes 29, and received within the tubes 29 are the rods 30 which are secured at 31 to the substantially inverted U-shaped member 32 which is attached by means of the wing nuts 33 to the topmost of the longitudinally positioned spaced further tubes 34, the character 35 indicating vertically positioned brace rods.

Welded to the vertical members 10 and 22 (see FIGURES 1, 5, and 6) are the flanges 36 having the spaced openings 37, certain of the openings 37 being adapted to receive the vertically positioned tubes 38, the tubes 38 including the spaced openings 39 which are adapted to receive the cotter keys 40.

The character 41 indicates U-shaped members receiving the vertical rods 42 therein, the rods 42 having the looped upper portions 43, and the character 44 indicates spaced horizontally positioned wires or bars connected to the vertically positioned bars 45 to provide a cage-like structure, the character 46 (see FIGURE 7) indicating vertical end wires or bars attached to the angularly bent portions 47, which are bent from the topmost members 44 to provide an off-set arrangement for adjustable positioning of the mesh structures 44, 45 when it is desired to provide a passageway beneath the mesh structures for the small pigs and the like, this off-set arrangement permitting raising of these structures and adjustable positioning vertically as desired.

The rods or tubes 34 are attached to the vertically positioned tubes 38.

The character 48 indicates generally a feeding and watering trough, the character 49 indicating the water compartment and the character 50 the feed compartment, these compartments being separated by the partition 51. The member 48 includes the sloping walls 52 and 53, the portion 52 permitting filling from the outside, the wall at 53 of course being on the inside, the character 54 indicating end walls, and the character 55 (see FIGURE 2) indicating a transverse vertical partition which does not extend downwardly the full distance of the trough in order to allow the water and feed to pass into the other portions.

Secured to the walls 54 are the ears 56 which are received between the ears 57, which ears 57 are attached to the members 10, the character 58 indicating vertical rods passing through suitable openings in the various ears to provide means for securing the trough in the unit.

If it is desired to remove the trough, a flat plate 59 (see FIGURE 4) which includes the substantially square openings 60 is attached by using the same rods 58, the openings 60 receiving the ears 57. The character 61 indicates the various wire meshes forming the other end of the unit.

In many cases a divider board can be used for separating the small pigs, in which case a channel member 62 is attached to one of the cage-like structures at either side thereof for receiving the divider board 63.

It will be noted from FIGURE 1 that the various cage structures 44, 45 can be assembled as shown in various lengths if necessary, the space between these structures being occupied by the small pigs, and in FIGURE 1 the character 64 indicates by dotted lines a wall which may terminate one of the cage structures, however, on the left-hand side any length can be used, or can be engaged with further mesh structures, and being attached to further units containing a sow.

If desired as explained above, the rods 42 can be raised, and due to the off-set arrangement at 47, the mesh structures 44, 45 can be elevated to allow the small pigs to pass thereunder, with the bars 44 resting on any of the members 41.

If it is desired to widen the unit containing the sow, the cotter keys 40 are merely removed and replaced in any of the openings 39, there being a cotter key on the top of the flange 36 and at the bottom thereof to thereby securely hold the members 34 in any desired elevated position which will correspondingly raise the lower-most tube 34 to the desired position consistent with the size of the pigs while suckling, and as the mother sow rests on her side. Also, the vertically positioned tubes 38 can be placed in either of the openings 37 to provide a narrower or wider spacing of the side units to accommodate the various sow sizes. The gate 14 can be removed by raising the hook 25 and raising the gate, which will carry the rod 15 out of the ears 17, and the gate can be replaced in the converse manner.

It will be noted from the foregoing construction that the various members comprising the parts 10, 12, 34, 38 can be disengaged for shipping purposes or for storage purposes, and also the rods 30 can be moved inwardly within the tubes 29, whereby these members and the member 32 can be pivoted downwardly in the direction of the arrow 65 (see FIGURE 2) which will reduce the distance between the pivoting point at 27, so that the member 32 will then pivot within the confines of the base 66, the feed trough of course being separate. The upper framework comprising the various members 29, 30 and 32 provides an upper enclosure which will leave part of the sow exposed for vaccination or any other desired purpose. The pairs of further bars 67 can be used if desired for insertion of a board 68, shown by dotted lines, to prevent backing of the sow into the gate.

It will now be seen that we have provided the advantages mentioned in the objects of our invention with further advantages being readily apparent.

Some changes may be made in the construction and arrangement of the parts of our invention without departing from the real spirit and purpose of our invention, and it is our intention to cover by our claim any modified forms of structure or use of mechanical equivalents which may be reasonably included within its scope.

We claim as our invention:

A farrowing crate comprising a vertically positioned framework end member, a gate member attached thereto, a further vertically positioned framework end member spaced from said framework end member, vertically positioned support rods including side bars attached thereto for providing side members, means for adjustably positioning said vertically positioned support rods, said adjusting means including horizontally positioned flanges attached to said vertically positioned end members, said flanges having a pair of spaced openings adapted to selectively receive said vertically positioned support rods, said support rods having a plurality of vertically spaced openings for receiving cotter keys to support said support rods on said flanges, a plurality of vertically positioned cage-like flat members adapted to be attached to said end framework members including vertically positioned further rods engaged with said cage-like members and said end members, an upper enclosing member pivotally attached to said further framework end member, and including longitudinally positioned tubes, still further rods received within said tubes, a transverse strap attached to said still further rods, said strap being substantially of inverted U shape, the lower terminals of said strap being secured to the upper side bars of said side members, said still further rods being forced into said tubes to reduce the length of said upper enclosing member when pivoted toward said further framework end member, said spaced openings providing means for widening said crate, a vertically positioned rod attached to said gate member, a sleeve slidably receiving said vertically positioned rod, a hook member attached to said sleeve adapted to receive an upper portion of said framework end member, a transverse locking rod attached to said gate member, ears attached to the sides of said framework end member for receiving the ends of said locking rod, said further framework end member having a lower open portion, a feed and water trough receivable in said open portion, further ears attached to said feed and water trough, still further ears attached to said further framework end member, securing rods passing through said further ears and said still further ears, a plate member having openings for receiving said still further ears when said plate member is used to replace said feed and water trough, said cage-like flat members including off-set inner portions engaging said further rods and including vertically positioned end bars at the terminations thereof.

References Cited by the Examiner

UNITED STATES PATENTS

| | | | |
|---|---|---|---|
| 1,083,458 | 1/1914 | Moore et al. | 39—78 |
| 3,105,462 | 10/1963 | Miller | 119—20 |
| 3,125,988 | 3/1964 | King | 119—20 |
| 3,181,503 | 5/1965 | Tripp | 119—20 |
| 3,204,606 | 9/1965 | Parr et al. | 119—20 |

SAMUEL KOREN, *Primary Examiner.*

HUGH R. CHAMBLEE, *Examiner.*